E. S. CAMERON.
TRACTOR.
APPLICATION FILED JAN. 24, 1919.

1,434,199.

Patented Oct. 31, 1922.

E. S. CAMERON.
TRACTOR.
APPLICATION FILED JAN. 24, 1919.

1,434,199.

Patented Oct. 31, 1922.
9 SHEETS—SHEET 9.

Witnesses:

Inventor:
Everett S. Cameron,
By his Atty

Patented Oct. 31, 1922.

1,434,199

UNITED STATES PATENT OFFICE.

EVERETT S. CAMERON, OF STAMFORD, CONNECTICUT, ASSIGNOR OF ONE-THIRD TO BENJAMIN HARRIS, OF STAMFORD, CONNECTICUT, AND ONE-THIRD TO JOHN HANSON, OF GREENWICH, CONNECTICUT.

TRACTOR.

Application filed January 24, 1919. Serial No. 272,919.

*To all whom it may concern:*

Be it known that I, EVERETT S. CAMERON, a citizen of the United States, residing in Stamford, in the county of Fairfield and State of Connecticut, have invented certain new and useful Improvements in Tractors, of which the following is a specification.

This invention relates to tractors such as are used for drawing plows, various agricultural implements and other vehicles.

One object of the invention is to improve generally the construction, operation, and economy of manufacture of such devices.

Another object is to provide an improved construction of transmission housings, whereby the various mechanisms of the transmission, and the housings, may be easily assembled and disassembled.

Another object of the invention is to provide an improved change speed mechanism for apparatus of this kind.

Another object is to provide an improved method for steering the tractor or enabling it to turn in very limited areas with ease and facility.

Another object is to provide a convenient and efficient mechanism by means of which the steering road wheel may be easily and quickly disconnected from the hand steering mechanism to permit the same to move freely as the tractor is turned around.

Another object is to provide an arrangement whereby a single steering road wheel carried upon a caster or a two-wheel steering mechanism carried upon a transverse axle, may be easily and quickly interchanged.

Another object of the invention is to provide an efficient mounting for the front axle whereby great latitude of movement is permitted between the front axle and frame of the machine as the tractor is moved over rough and uneven ground.

Another object is to provide a flexible three-point suspension for supporting the motor and the transmission mechanism upon the frame of the tractor.

Another object is to provide an efficient method of mounting and cooling the radiator for the motor, whereby the dust from the cooling air is drawn out of the tractor and not blown into its various mechanisms.

Another object of the invention is to provide a convenient method of taking off power from the tractor motor, for driving stationary machines while the tractor is itself held stationary.

Another object is to provide an adjustable draw-bar for the tractor, whereby the direction of the draft of the tractor may be easily varied to accommodate the various machine and implements that may be drawn thereby.

While herein various details of the various inventions have been described and claimed as being parts of a tractor, it is particularly noted that the invention is not limited to these details, nor to tractors, or even vehicles, but may be used with any kind of apparatus and still come within the scope of the claims.

In the accompanying drawing showing by way of example one of many possible embodiments of the invention,—

Fig. 3ª is a front elevation of another form of steering mechanism used with the tractor;

Fig. 17ª is a horizontal sectional view, partly in plan, taken through the connection between the transmission and the drive wheels;

Fig. 18 is a vertical sectional view of the cover plate for the cover housing showing a portion of the reversing mechanism mounted thereon;

Figure 2:
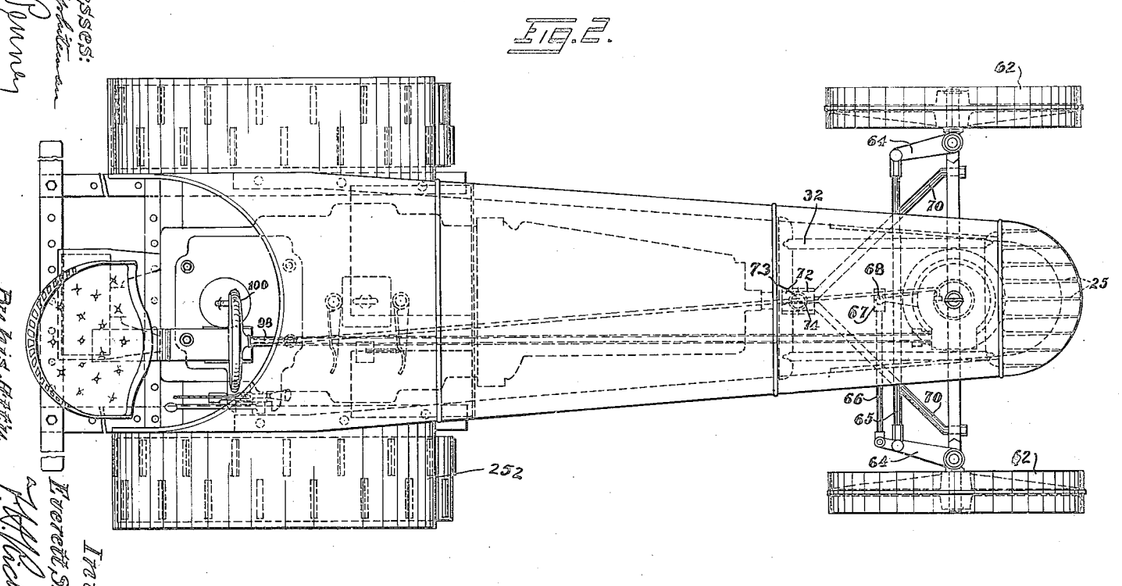
Fig. 2 is a plane of the same.
Figures 3, 3A:
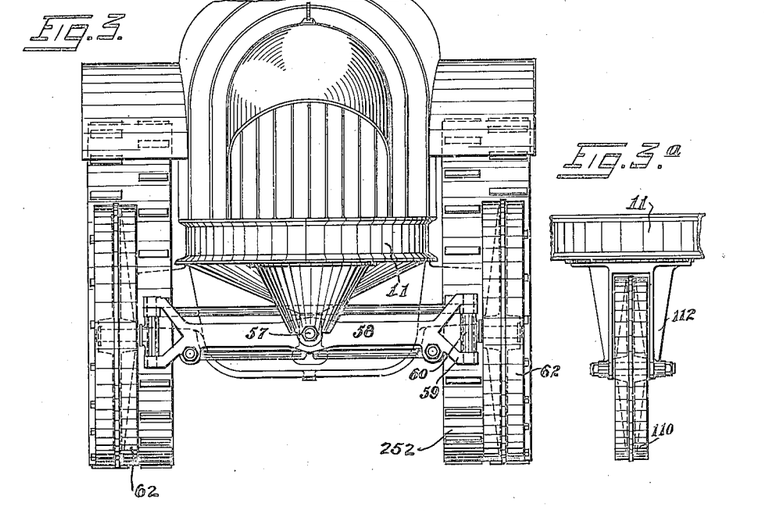
Fig. 3 is a front elevation of the tractor showing one form of steering mechanism used therewith.
Figure 4:
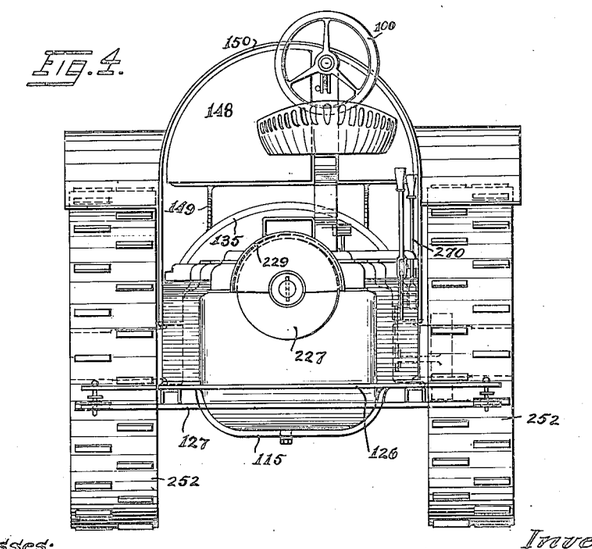
Fig. 4 is a rear elevation of the tractor.

The various mechanism of the tractor are mounted upon a main frame 10, (Figs. 1, 2, and 3), of channel shape cross-section, and formed with a front curved yoke 11, and side members 12 diverging toward the rear of the tractor. At the forward end of said main frame, there is provided a bottom plate or frame 14 (Fig. 5) provided with an upturned flange 15, bolted at the front and sides to said main frame. Said bottom plate is provided at its middle part with a central opening 16 surrounded by a flange forming an annular seat 17. The rear part of the bottom plate is provided with a rear bracket 18, a downturned bracket 19, and upstanding jacket-support 20 provided with an approximately semi-cylindrical seat 21.

Upon the forward end of the main frame, there is mounted a hollow cooling jacket 24 bolted to said yoke 11, and provided with forwardly projecting hollow cooling fins 25 (Fig. 2) and a horizontal web 26 (Fig. 5) connecting said fins, and provided with inlet openings 28 passing through said web for the purpose of admitting cooling air to the radiator, later to be described.

At the rear of said bottom plate, there is provided a transversely disposed water jacket 30 provided at its lower part with a supporting bracket 31 mounted on said upstanding jacket support 20, and provided with a semi-cylindrical seat complementing the semi-cylindrical seat 21, to form a cylindrical opening for a purpose later to be described. Said jackets 30 are each provided at their inner faces with inwardly projecting hollow shelves 32, each provided with openings 33. Upon said shelves there are supported a plurality of head chambers 34, communicating through said openings with the interior of the jackets 30 supporting radiating tubes 35 communicating with and supported by the head chambers. These head chambers and radiating tubes comprise a plurality of radiator sections arranged side by side (Fig. 2) which may be removed or added to in order to provide just the required amount of radiation in order to adopt it to the climate in which the tractor is used, or the prevailing weather at any time.

Upon the seat 17 of the bottom plate 14, there is bolted a hollow pedestal 36 having the periphery of its base 37 (Fig. 5) bolted to said annular seat 17. At the upper end of said pedestal, there is provided an upstanding steering post sleeve 38 having an enlarged portion 39, where it joins said base, and having at its upper end an outwardly and upwardly and outwardly extending flange 40, forming a lower housing member of the gear housing 41, later to be described. In the enlarged portion 39 of said pedestal, there is disposed a bearing bushing 44, provided at its lower part with a bearing flange 46, and with a groove carrying flange 47 provided in its upper face with an annular groove in which is disposed a bearing washer 48 bearing against the lower part of the base 37.

Passing axially through said bearing sleeve 39 and said bushing, is a steering post 50 provided at its lower end with a laterally turned lower end portion 51 engaging in a radial recess 52 provided in said bearing flange 46. Beneath said bottom plate and surrounding said central opening 16 there is bolted to the bottom plate a downwardly opening hollow cone-shaped supporting bracket 54, having at its rear side a horizontal opening 53 through which said lower end portion 51 of the steering post passes. The lower part of the cone-shaped bracket is thickened, and transversely cleft to form a transverse opening 55 and a pair of bearing lugs 56. Between said bearing lugs 56 there is fulcrumed on fulcrum pin 57 (Fig. 3) the front axle 58 of the tractor. The ends of the front axle are provided with knuckle yokes 59, between which are pivotally mounted steering knuckles 60, on which are mounted the steering road wheels 62.

Each knuckle is provided with a steering arm 64 (Fig. 2) connected together by the tie rod 65 to hold the road wheels in proper relation to each other. One of said steering arms has pivotally secured thereto, a reach rod 66 provided with a ball receiving socket 67 receiving the ball 68 provided on the lower end of the laterally turned portion of the steering post.

The fulcrum mounting of the front axle permits the tractor to be used on very rough ground, in which case there is a good deal of up and down movement of the ends of the axle which together with the transverse movement of the lower end of the steering post, requires a universal connection between the steering post and the reach rod, which universal connection is furnished by means of the joint formed by the socket 67 and the ball 68.

In order to permit free movement of the axle on the pin 57, and at the same time hold the axle in correct transverse relation with the tractor as a whole, there are provided a pair of diagonal brace rods 70 (Figs. 2 and 5) secured respectively at their outer ends to the outer end portions of the front axle and having their inner ends 71 spaced near together and parallel and carrying bolted thereon, a pair of socket blocks 72 provided on their inner ends with recesses together forming an approximately spherical socket 73 in which is received the ball 74 carried on the lower end 75 of the bottom plate 14.

Figure 12:
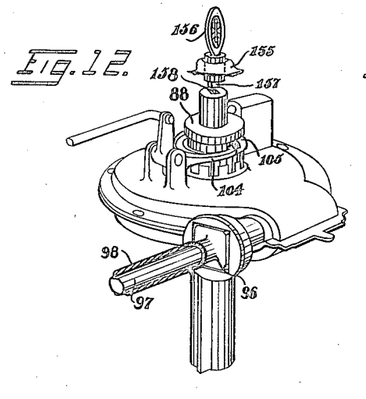
Fig. 12 is a perspective view of a portion of the mechanism of Fig. 7.
Figure 13:
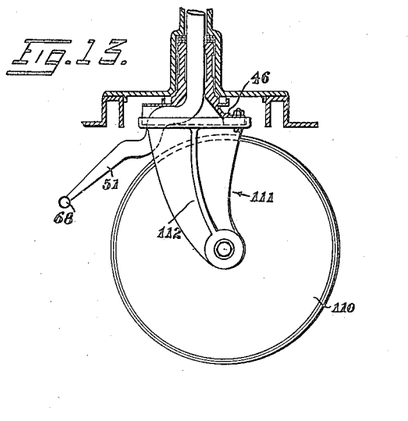
Fig. 13 is a side elevation, partly in section, showing the steering caster of Fig. 3ª.

Upon said lower housing member 40 (Fig. 7) there rests an upper housing member 80 having a downwardly outwardly turned flange resting upon the peripheral portion of the lower housing member to form the gear housing 41, said upper housing member being provided with a central opening 82 surrounded by a bearing boss. Within said housing there is provided a worm wheel 85 loosely mounted upon said post 50, and provided at its upper part with clutch teeth 86 adapted to be engaged by clutch teeth 87 provided upon the vertically slidable peripherally-grooved clutch member 88, keyed on said steering post. The worm wheel 85 is held spaced from the lower part of the housing 41, by means of a bearing washer 89, supported upon a bearing bushing 90 carried in the upper part of said bearing sleeve. Said bearing housing is formed with bearing members 92 (Fig. 8) forming bearings on the worm shaft 93 mounted therein, and carrying the worm 94 engaging the teeth of the worm wheel 85. Upon the rear end of the worm shaft 93 there is fixed a square cup-shaped clutch member 95 adapted to receive the squared head 96 (Fig. 12) fixed upon the forward end of the steering shaft 97 extending rearwardly through the steering shaft sleeve 98 to the steering hand wheel 100 at the rear part of the machine. Upon the rear part of the upper housing member 80 there is provided an upstanding lug 101 on which is pivotally mounted an elbow lever 102 comprising an upper arm 103 and a lower bifurcated arm 104, the ends of which engage in the groove 105 of the clutch member 88. Said upper arm 103 has pivotally connected thereto a releasing bar 107 (Fig. 5) extending rearwardly to near the hand wheel 100, and linked to a releasing lever 108 pivoted to the steering shaft sleeve 98. As the clutch member 88 is keyed to the steering post in such a manner that it is slidable thereon but not rotatable relative thereto, it is possible by drawing rearwardly the releasing lever 108 to raise the clutch member 88 out of engagement with the worm wheel 85, so that the handwheel 100 is operatively disconnected from the steering post 50, so the latter may be free to move under the influence of the action of the ground on the steering road wheel. This unclutching may be used in connection with the steering wheels which have just been described, but is particularly used in connection with the single steering wheel 110 (Fig. 13) which may be used in place of the steering road wheels 62 and the supporting bracket 54 when they are removed and the steering caster 111 substituted in their place. This steering caster is detachably bolted to the bearing flange 46 of the pedestal 36, and is provided with a pair of downwardly projecting fork prongs 112 between which the steering road wheel 110 is rotatably mounted. The action of this steering road wheel will again be referred to after the mechanism for driving the tractor has been described.

Between the rear ends of said side members 12 of the main frame, there is disposed a main transmission housing 115 (Fig. 5) provided with a forward flange 116, and with laterally projecting front and rear bearing housing 118 and 119 (Fig. 17) engaging under said side members 12. Beneath said bearing housings there are provided supporting bars 122 (Fig. 14), which extend rearwardly some distance to the rear of the main transmission housing. Disposed across and secured near the rear part of said supporting bars, there are provided upper and lower front attaching bars 124 and 125, (Figs. 5 and 17), and at the extreme rear of said supporting bars are secured the transverse upper and lower rear attaching bars 126 and 127. These attaching bars are provided with a plurality of alined openings 128, through which are passed pins 129, passing through suitable openings in the draw bar 130.

By this arrangement the draw bar can be made to assume practically any position or angle along the attaching bars, so that any direction of draft of a machine or the like drawn by the tractor may be secured.

Figures 5, 22:
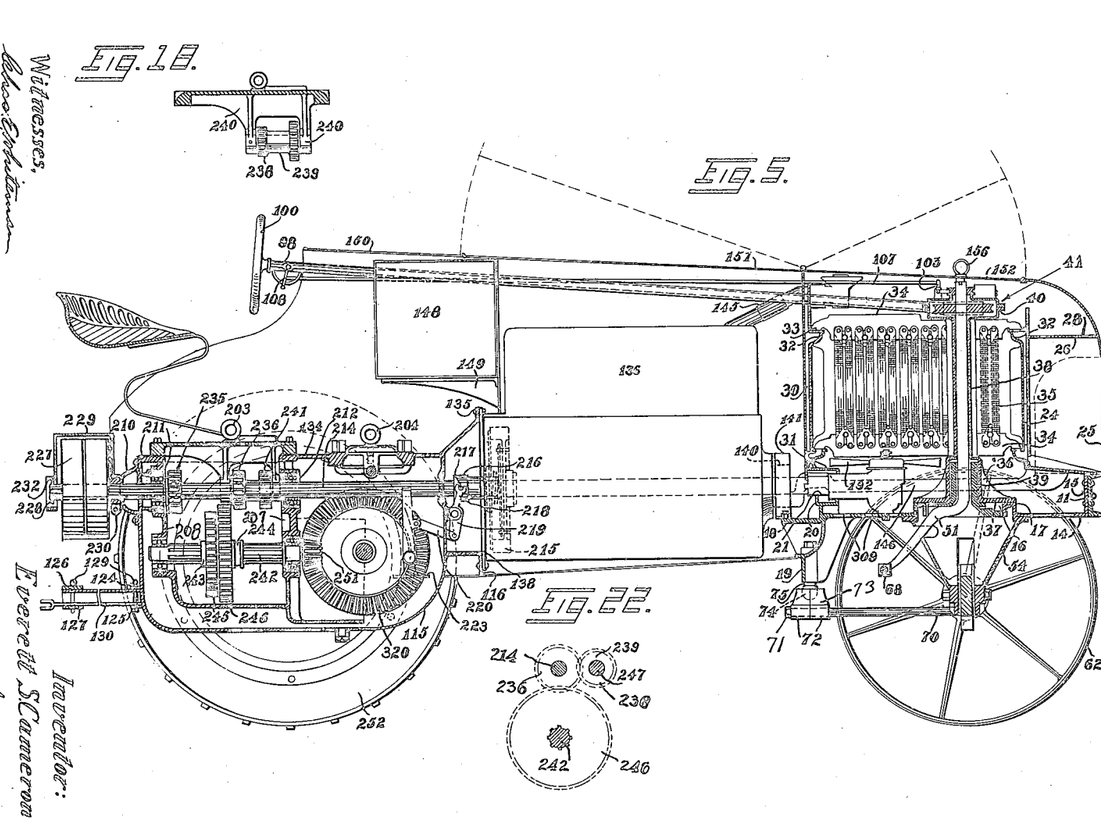
Fig. 5 is a central longitudinal vertical sectional view of the tractor.
Fig. 22 is a diagrammatical transverse secional view showing certain relations of the reversing mechanism.

At the upper edge of the main transmission housing 115, there is provided a laterally projecting flange 133, (Fig. 14), upon which rests the housing cover 134, also provided with a forward flange 135 forming a continuation of the flange 116, (Fig. 5). Between the flanges 116 and 135 and the rear bracket 18 there is disposed a suitable internal combustion motor 136, provided with a suitable motor housing having a rear flange 138 bolted to said flanges 135 and 116. The forward end of said motor housing is provided with a forward extension provided with a reduced portion 140, loosely engaging in a ring bracket 141, mounted upon the rear bracket 18. It will be seen that by this arrangement the motor housing and the main transmission housing being firmly bolted together form a larger housing having a three-point suspension upon the main frame. This larger housing is loosely supported at the ring bracket 141 and at rear is supported on opposite sides by means of said supporting bars 122. This arrangement permits great flexibility of the main frame as the tractor moves over uneven ground. The cooling spaces of the motor housing are suitably connected by means of flexible connections 145 and 146 (Fig. 5) with the upper part of the water jacket 30 and the lower part of the cooling jacket 24 respectively.

Above the rear part of the lower housing a suitable fuel tank 148 is supported on brackets 149. Over the tank is disposed a cowl 150 enclosing a space above the main transmission housing. Hinged to the upper part of the water jacket 30 is the motor-hood 151 disposed over and covering the motor 136. On this same jacket there is also hinged the radiator-hood 152 provided at its intermediate part with a thickened boss 155 (Fig. 12) in which is rotatably mounted the direction indicator 156, provided at its lower end with a squared projection 157 adapted to engage in the squared opening 158 of the steering post 50. This direction indicator is used for indicating the direction of the caster 111 as will be explained.

Figure 6:
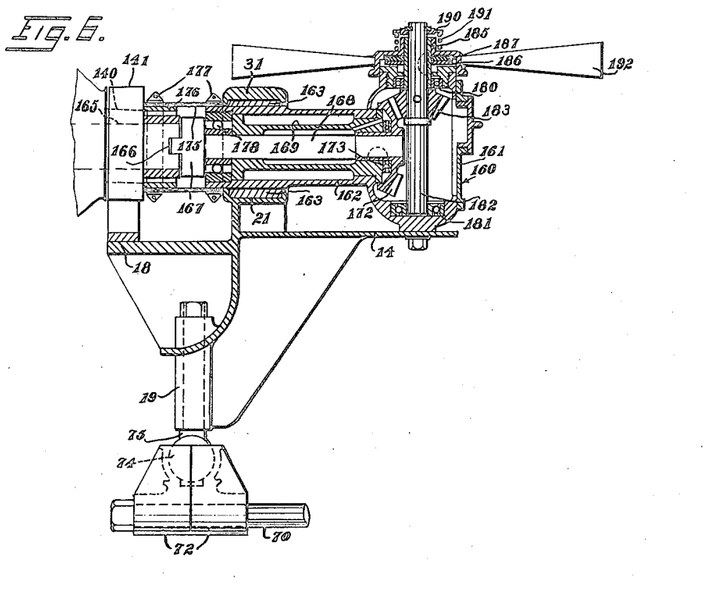
Fig. 6 is a longitudinal vertical view, partly in side elevation, showing the mechanism of the fan for cooling the radiator.

To an intermediate part of the bottom plate 14, (Fig. 6) there is bolted the fan gear housing 160 comprising a vertical portion 161 and a horizontal portion 162 babbitted as at 163 in said semi-cylindrical seat 21 in alinement with the crank shaft 165 of the motor. Upon the forward end of the crank shaft there is provided a clutch opening 166 in which engages the clutch head 167 mounted upon the connecting shaft 168 rotatably mounted in a thrust sleeve 169 carried in said horizonal portion 162. Upon the forward end of the connecting shaft there is provided a beveled gear between which and said thrust sleeve there are disposed thrust bearings 173. The clutch opening 166 and head 167 form a floating connection, which is surrounded by a flexible fabric or the like 175 clamped, by means of clamping rings 177, to said horizontal portion 162 and a reduced portion 176 on said ring bracket 141. The rear end of the connecting shaft 168 is supported in bearings 178.

Said vertical portion 160 is provided with upper and lower bearings 180 and 181 in which is rotatably mounted the fan shaft 182 carrying a driven gear 183 adapted to mesh with said beveled gear 172. Upon the upper part of said fan shaft there is keyed a sleeve 185 on which is carried a friction disk 186 upon which rests a friction washer 187 engaged by a cap 188 loosely received on said sleeve. At the upper end of said fan shaft there is keyed a thrust disk 190 between which and said fan there is disposed a helical spring 191 for pressing said cap against the friction washer. Fan blades 192 are carried upon the cap 188. This arrangement provides a yieldable connection between the fan and the fan shaft, so that should the operator's hand or any foreign object be caught in the fan blades, the fan will merely be held stationary while the fan shaft continues to rotate, thus preventing any injury either to the fan or the operator.

Figure 16:
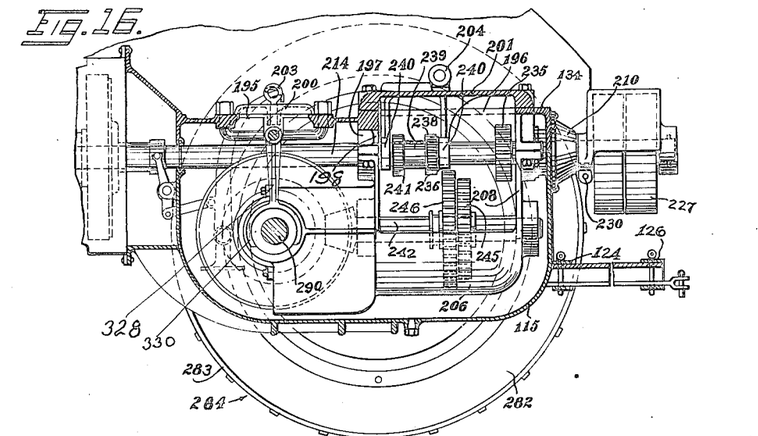
Fig. 16 is a longitudinal vertical sectional view taken through the rear part of the tractor.

The housing cover or cover housing 134 (Fig. 16) is provided with a forward opening 195, a rear opening 196, a transverse partition 197 and an inner rear flange 198. Over the forward opening 195 and the rear opening 196 are disposed a forward cover 200 and a rear cover plate 201 provided respectively with upwardly projected eyes 203 and 204 by means of which the cover or cover plate may be lifted off from the cover housing, or the cover housing, the cover, and cover plate may be lifted off from the main transmission housing 115. Bolted to said partition 197 and said flange 198, there is an inner transmission housing 206 provided with a front wall 207 and a rear wall 208, bolted to said partition 197 and flange 198, respectively.

Figure 1:
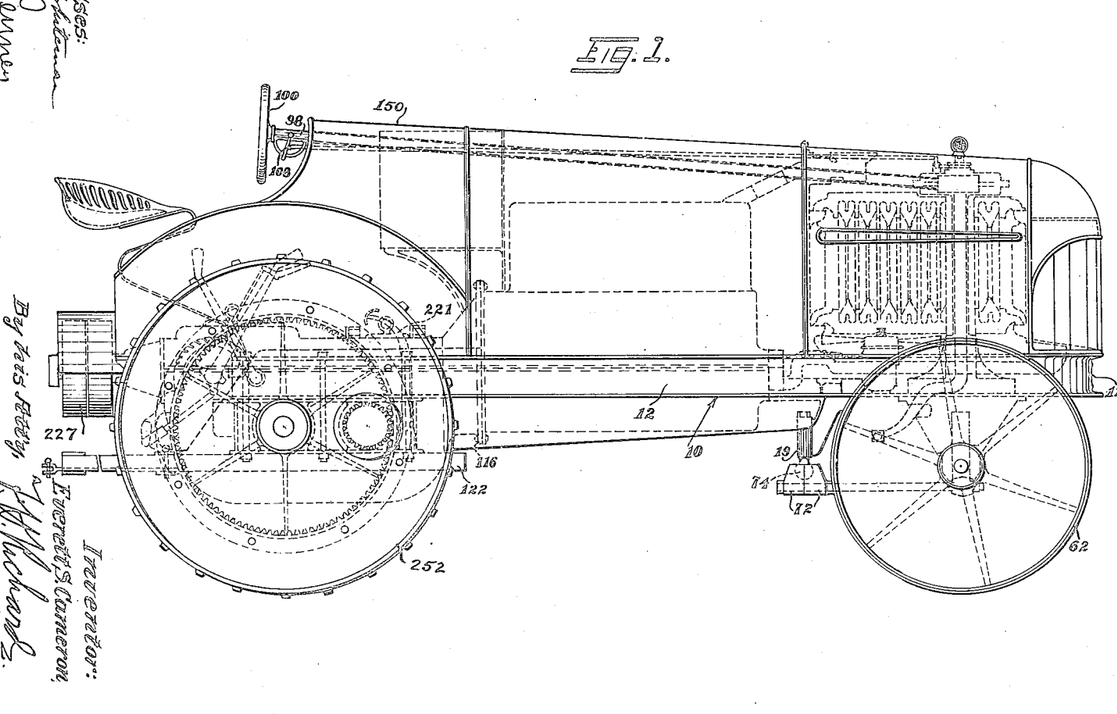
Figure 1 is a side elevation of the tractor.

At the rear of said transmission housing and in the plane of meeting between said cover housing on the one hand, and said transmission and inner housings on the other, there is disposed a bearing casing 210 (Figs. 5 and 16) bolted to the rear part of said cover housing and said main transmission housing, and having therein a set of bearings 211. At the plane of parting between said forward wall 207 and said partition 197 there is also provided a set of bearings 212. In these bearings 211 and 212 there is disposed the power shaft 214 in alinement with the crank shaft of the motor and projecting at the rear of the housing. At the forward end of the power shaft there is provided a main clutch 215, which may be of any suitable form and which is provided with an operating member 216 provided with lateral pins 217 adapted to be engaged by the bifurcated end 218 of the lever 219 intermediately fulcrumed upon the forward wall of the main transmission housing and having a lower arm connected by means of a link 220 to the foot pedal 221 mounted upon the bracket 223 carried upon one of the supporting bars 122 (Fig. 1).

Upon the rear of said power shaft is a power take-off pulley 227 (Fig. 5) and a crank engaging pin 228. Disposed around a portion of said pulley, there is provided a cover guard 229 provided at its forward part with a clamping ring 230 by means of which it may be clamped to the reduced rear end of the bearing casing 210. The rear part of the cover guard is provided with a protecting ring 232 surrounding and spaced a distance from the rear part of said power shaft at said engaging pin. By means of this pin the shaft may be engaged with a crank for cranking the engine. By means of the pulley 227 power may be taken from the motor for driving various machines, at which time the tractor would be held stationary. By means of the protecting ring 230 the cover guard may be shifted, depending upon which direction the power belt leaves the pulley.

Upon the power shaft between the walls 207 and 208 (Figs. 5 and 16) there are fixed the high-speed gear 235 and a low speed gear 236. The low speed gear meshes with the rear pinion 238 fixed upon the rear part of the reversing spool 239 rotatably mounted between the downwardly projecting brackets 240 (Fig. 18) formed on the lower part of the cover plate 201. Upon the forward end of the reversing spool there is carried a forward pinion 241.

Rotatably mounted in the front and rear walls 207 and 208 of the inner housing is the splined transmission shaft 242 upon which is longitudinally slidably disposed a gear supporting sleeve 243 held against rotation relative to the transmission shaft and provided with an annular shifting groove 244. Upon this sleeve is fixed the rear or smaller transmission gear 245 adapted to mesh with the high-speed gear 235 when the sleeve is moved to its rearmost position. On said sleeve there is also fixed a larger transmission gear 246 adapted to mesh with said lower speed gear 236 when the sleeve is in an intermediate position. When the sleeve is moved to its forward position said larger gear meshes with the forward pinion 241, which is on the shaft 247 with the rear pinion 238, by slidably passing between the teeth of the low speed gear 236. Therefore it will be noted that with 236 there meshes both the low speed gear 236 there meshes both the low speed gear 246 and the rear larger transmission gear 246 and the rear pinion 238. This is possible because the shaft 247, (Fig. 22), of the reversing pinion is disposed to one side of the main power shaft.

Upon the forward end of the transmission shaft 242 there is provided a small beveled gear 251 from which power is transmitted to the drive wheels 252 of the tractor as will be presently explained.

Figure 19:
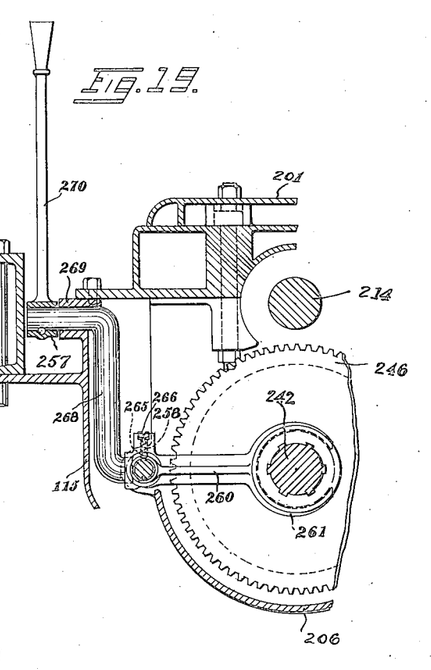
Fig. 19 is a transverse view taken through the shifting mechanism of the transmission.
Figure 20:
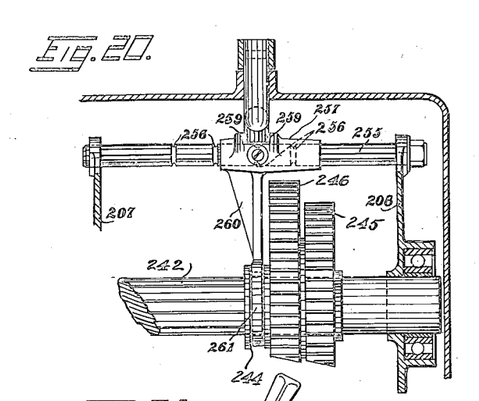
Fig. 20 is a horizontal sectional view showing details of the shift mechanism in plan.
Figure 21:
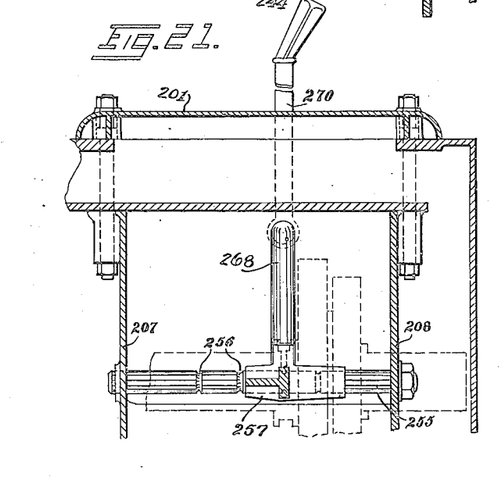
Fig. 21 is a longitudinal view showing details of the shift mechanism in side elevation.

Now will be described the means for shifting the gear supporting sleeve 243 to give the various speeds and direction to the tractor. A guide rod 255 (Fig. 20) secured between the front and rear walls of the inner housing is provided with four annular stop grooves 256 and has slidable thereon a gear shift sleeve 257 provided with a laterally extending ball guide bore 258, (Fig. 19), a pair of vertical guide forming shoulders 259, and a laterally projecting shift bracket 260 provided with bifurcations 261 engaging in said annular groove 244 of the gear supporting sleeve.

In the lower end of said bore 258 there is disposed a ball 265, while in its upper end there is disposed a screw plug 266 between which and said ball there is disposed a small spring adapted to present said ball into any one of said grooves 256, yieldably to hold said shaft and therefore said transmission gears in any one of four adjusted positions.

When the supporting sleeve 243 is in its rearmost position and the smaller transmission gear is in engagement with the high-speed gear 235, the tractor is driven forward at its highest speed. When the sleeve is at the second to the rearmost position neither of the gears 245 and 246 is in engagement with any speed gear and the transmission gear is in unclutched or neutral position. When the sleeve 243 is moved forward to the third annular groove 256, the large transmission gear is in engagement with the high-speed gear 236 and the tractor moves forward at a lower speed. When however, the larger transmission gear 246 is moved to its forward position and is in engagement with the forward pinion 241, the interposition of the reversing spool 239 between the transmission gear and the speed gear causes the direction of rotation of the transmission gear to be reversed, and the tractor moves rearwardly.

For shifting the shift sleeve and consequently the transmission gears, there is provided a shift lever 268 (Fig. 19) provided with an inwardly turned lower end engaging between said shoulders, and an outwardly extending upper end rotatably mounted in a boss 269 in the side wall of the main transmission housing 115. At the outer end of said upwardly extending end there is fixed a change-speed hand lever 270 by means of which said lever 268 and consequently the transmission gears may be shifted to change the speed of the transmission.

Figures 17, 17A:
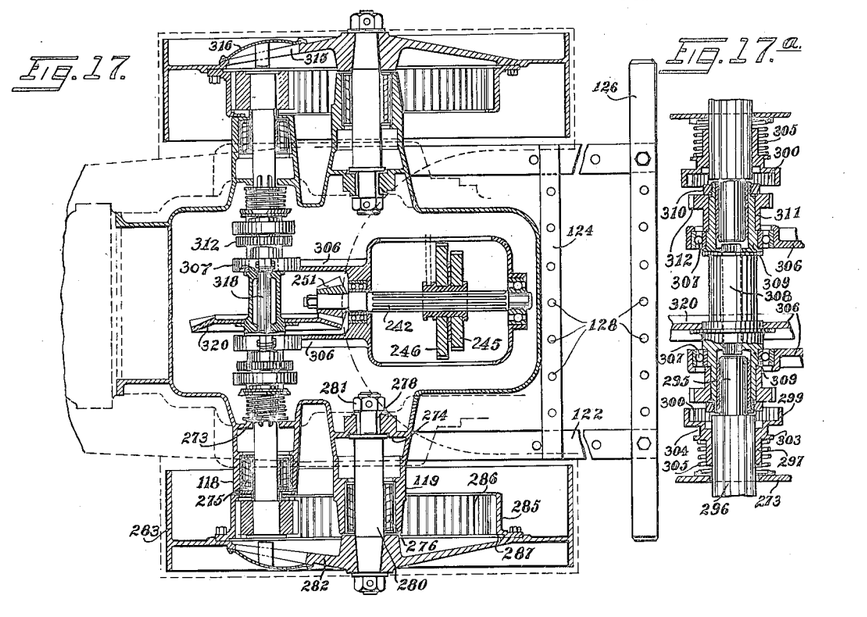
Fig. 17 is a horizontal sectional view taken centrally through the rear part of the tractor.

Near the inner ends of said bearing housing 118 and 119 respectively, there are provided inner bearing walls 273 and 274 having bearing openings, (Fig. 17). Near the outer portions of said bearing housings there are provided roller bearings 275 and 276. Rotatably mounted in said bearings 276 and the bearing opening 278 of said rear bearing housing are the drive wheel axles 280 each provided at its inner end with a retaining nut 281, and having mounted on its outer end a supporting disk 282 the periphery of which is formed with a cleated rim 283, said rim and disk together forming the drive wheels 284.

Figure 14:
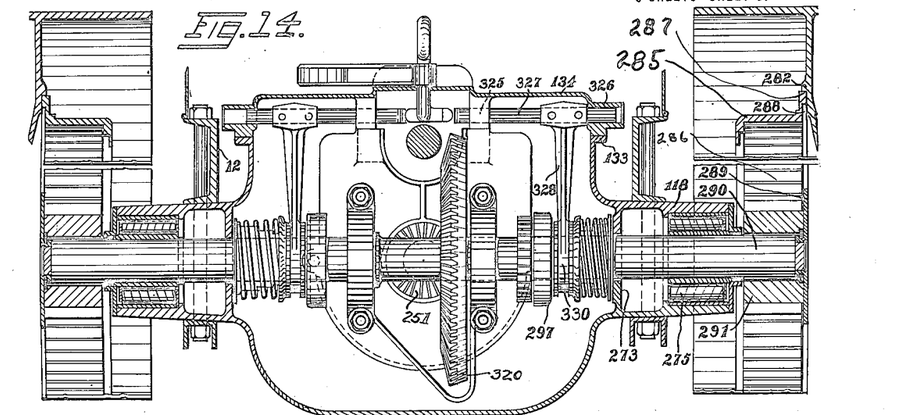
Fig. 14 is a vertical transverse sectional view taken through the forward part of the transmission gear.

Upon the inner face of each of said disks is secured a gearing 285 provided with an internal gear 286, and at its outer lateral face with an annular shoulder 287 forming with said disk a retaining groove 288 (Fig. 14). In said groove there engages the periphery of a circular retaining plate 289 fixed upon the outer end face of the bull pinion shaft 290 and the bull pinion 291 fixed on said shaft. The gear retaining plate 289 is of sufficiently small diameter to pass through the closable opening or hand hole hereinafter mentioned of a drive wheel. The bull pinion is rotatably mounted in the rear roller bearings 275 and the bearing opening of said bearing wall 273.

The inner end of each bull pinion shaft is provided with a reduced portion 295 (Fig. 17ᵃ) and the intermediate part of the bull shaft adjacent to said reduced portion is provided with splines 296. Slidably mounted upon each of said intermediate portions and in splined connection with the splines 296, is a clutch sleeve 297 provided at its inner end with a cup-shaped clutch member 299 provided with interior lugs 300. The intermediate part of the sleeve is provided with a flange 303 forming with said cup-shaped member, an annular groove 304. Between said flange 303 and said bearing wall 273 there is disposed a spring 305 adapted to yieldably move said clutch sleeve inwardly, for a purpose which will presently appear.

Upon the forward wall 207 of said inner housing, there is provided a pair of forwardly projecting bearing brackets 306 (Figs. 17 and 17ᵃ) in which are mounted ball bearing sets 307. In said bearing sets there is rotatably mounted a gear supporting sleeve 308 provided with shoulders 309 engaging the inner lateral face of the inner member of each bearing set. Each extremity of the supporting sleeve receives the inner reduced end 295 of each bull shaft. Said extremity is also screw-threaded and has thereon a nut 310 for holding in place the male clutch member 311 having splined connection with said sleeve and provided with exterior lugs 312 adapted to clutch the interior lugs 300 of said cup-shaped member, when the cup-shaped member has been moved inwardly by means of the spring 305.

As the reduced end 295 and the splines 296 of the bull shaft are loosely received in the clutch sleeve and the supporting sleeve, the bull pinion shaft may be moved longitudinally outward from said sleeve, when the disk 289 (Fig. 14) has been removed from the bull pinion and when the drive wheel has been turned until the closable opening or hand hole 315 (Fig. 17) has been moved to be co-axial with the bull pinion shaft, the door 316 thereof having been removed. The object of this is to permit the ready removal of the transmission gear as will be explained.

Between said reduced ends 295 of the bull shafts and within the supporting sleeve there is provided a thrust spindle 318 adapted to prevent too great an inner longitudinal movement of the bull shafts. Fixed upon said supporting sleeve is a master gear 320 adapted to mesh with the beveled gear 251 of the transmission shaft.

Figures 7, 9:
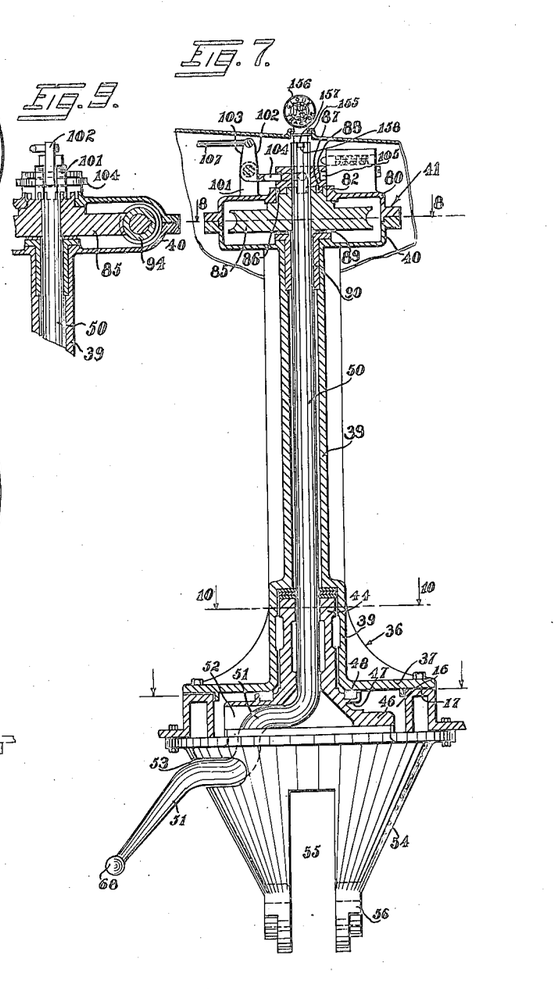
Fig. 7 is a vertical sectional view showing part of the clutch mechanism for connecting and disconnecting the hand steering wheel from the steering road wheel.
Fig. 9 is a fragmental sectional view taken on the line 9—9 of Fig. 8.
Figure 8:
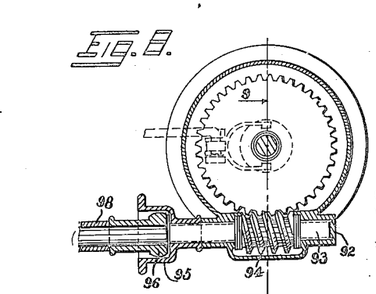
Fig. 8 is a sectional view taken on the line 8—8 of Fig. 7.
Figure 10:
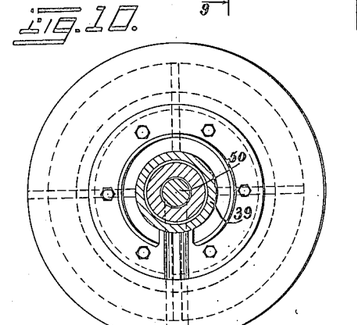
Fig. 10 is a sectional view taken on the line 10—10 of Fig. 7.
Figure 11:
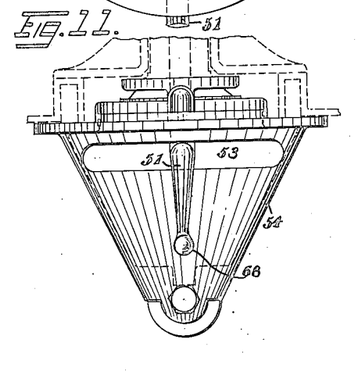
Fig. 11 is a rear elevation of the bracket for supporting the front axle of the tractor.

When the steering caster 111 (Fig. 3ᵃ) is used, and the clutching mechanism shown in Fig. 7, is unclutched, the tractor may be guided by means of the clutching mechanism of the bull pinion shafts. This is accomplished by holding one bull shaft in clutched relation with the transmission gear while the other shaft is unclutched. This arrangement is very effective in turning the tractor within a very small area, and may be also used in connection with the steering hand wheel 100 (Fig. 1) whether the hand wheel is used in connection with the steering caster 111 or the front axle 58 and the associated steering mechanism.

Figure 15:
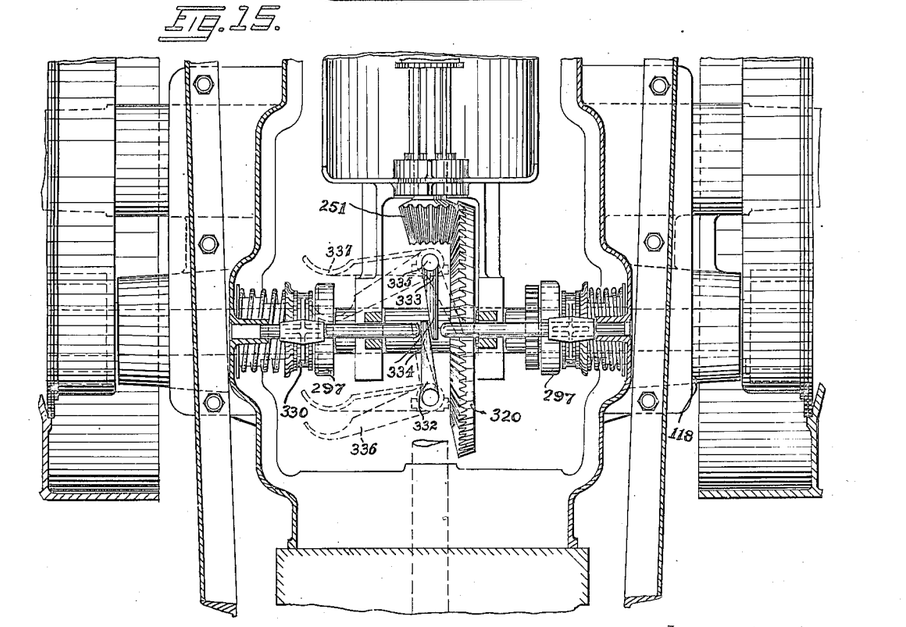
Fig. 15 is a horizontal sectional view taken through the upper part of the forward part of the transmission gear.

Now will be described the mechanism for operating the clutch members 297 for clutching and unclutching the bull pinion shafts. In the forward part of the cover housing 134 there is provided bearing bores 325 and 326 in which are slidably disposed a pair of transverse slide rods 327. Fixed on each of said slide rods is a downwardly projecting shift bracket 328, each having a fork shaped lower end 330, Figs. 14 and 16, engaging in said annular groove 304 of the clutch member 297. For operating these slide rods there are provided front and rear unclutching levers 332 and 333 (Fig. 15) having their active ends 334 engaging the inner ends of the slide rods respectively. The fulcrumed ends 335 of the unclutching levers are rotatably mounted in bearing openings in the cover housing, and project upwardly above said housing. On the projecting portion of said fulcrumed ends are fixed the front and rear foot levers 336 and 337 by means of which it is possible by the pressure of the foot to cause said clutch members 297 to move to unclutching positions against the action of the spring 305, said spring normally holding the clutch in clutched position.

The operation of the tractor as a whole, will now be described:

The transmission gears 245 and 246 (Fig. 5) being at the next to the rearmost position and therefore out of mesh with any of the speed gears, the motor of the tractor may be cranked by engaging the pin 288 with a suitable crank. If it be desired to move the machine forwardly at low speed, the main clutch 215 is unclutched and the transmission gear moved forwardly by means of the lever 270 until the larger transmission gear comes into mesh with the low speed gear 236. Then the main clutch is clutched again, after which the tractor will move forwardly at low speed. If it be desired to move the tractor at high-speed, the power shaft is unclutched and the transmission gear 245 moved into mesh with the high-speed gear 235 of the power shaft, whereupon the power shaft is again clutched to the motor. In like manner the tractor may be reversed by carrying the larger transmission gear into mesh with the forward pinion 241.

If the front axle 58 and the two steering road wheels 62 are to be used, the clutch mechanism of Fig. 7 ordinarily remains clutched and the tractor is guided in the ordinary way. If the steering caster and the single steering road wheel are used, the steering hand wheel 100 may still be used, and for ordinary use, this is the case: but when short turns are to be made, as for instance, when turning at the end of a furrow which has been plowed, it may be desired to unclutch the steering hand wheel from the steering post and permit the tractor to turn around by throwing one of the bull shafts and its associated drive wheels out of operative connection with the motor, whereupon the tractor turns around under the action of the other drive wheel. When this is taking place the caster 111 turns around and follows the axis of the steering post as the tractor turns around. After the turn has been made, it is desired to again get the caster in line with the tractor, whereupon, by means of the releasing lever 108, the steering hand wheel is again brought into operative relation with the steering caster, and the steering caster rotated until it is seen by the direction indicator 156 that the steering caster is in line with the tractor. When this is the case, the tractor then may be directed by the steering hand wheel in the ordinary way. In practice, the caster 112 may follow the axis of the steering post or travel in front of it, as seems best in view of the conditions of the road at the time.

When the front axle 58 and its associated steering mechanism are in use, the clutching mechanism of Fig. 7 will normally be in clutch position, though it may be that under certain circumstances it would be desirable to unclutch this mechanism.

When it is desired for any reason to remove the transmission gear from the main housing, this may be easily done as follows: The power shaft 214 (Fig. 5) is disconnected from the crank shaft of the motor, and the bearing casing 210 is unbolted from the transmission housing, whereupon the power shaft, its supporting bearings and all the gears carried thereon may be removed rearwardly through the opening in which the bearing casing 210 was mounted. The bull pinion shafts are then withdrawn in the manner previously explained; and the cover 134 is unbolted from the main transmission housing, whereupon all of the inner housing, the transmission mechanism, the master gear 320, and its supporting sleeve, may be hoisted out as a whole from the main transmission housing by means of suitable hoisting apparatus engaging the eyes of 203 and 204.

The direction of inclination of the fan blades 192 (Fig. 5) is such that when the fan is rotated the air is drawn downwardly from the radiator. By this arrangement, the cooling of the radiator is as follows: The air passes in at the front between the cooling fins 25 and thence upwardly through the opening 28 to the space above the radiator tubes. From here the air passes downwardly between the radiator tubes to the fan and is forced out through the large openings 309 (Fig. 5) in the bottom plate 14. The water jacket 30 extends entirely across the spaces between the radiator and the motor and effectually serves to prevent the passage of dust from the radiator to the motor. Furthermore, the fact that the fan blades exert a sucking action tending to suck the air away from the radiator rather than a blowing action tending to blow the air against the radiator, causes dust to be drawn away from the various mechanisms of the tractor rather than into them.

I claim:

1. In a tractor, in combination, drive wheels; power means for the tractor; a power shaft operatively connected to said power means; power transmission mechanism operatively connected to said power shaft; and bull shafts operatively connected to said transmission mechanism and to said drive wheels; said power shaft and bull shafts being removable from the tractor, and said power transmission mechanism being released from operative connection by removal of said power shaft and bull shafts and being removable from the tractor.

2. In a tractor, in combination, drive wheels; power means for the tractor; a power shaft operatively connected to said power means; power transmission mechanism operatively connected to said power shaft; and bull shafts operatively connected to said transmission mechanism and to said drive wheels; said power shaft and bull shafts being removable from the tractor, and said power transmission mechanism being released from operative connection by removal of said power shaft and bull shafts and being removable as a whole from the tractor.

3. In a tractor, in combination, drive wheels; power means for the tractor; a power shaft operatively connected to said power means; power transmission mechanism operatively connected to said power shaft; and bull shafts operatively connected to said transmission mechanism and to said drive wheels; said power shaft being removable from the tractor in the longitudinal line of the shaft and said bull shafts being removable laterally from the tractor, and said transmission mechanism being released from operative connection by the removal of said power shaft and bull shafts, and being removable from the tractor.

4. In a tractor, in combination, drive wheels; power means for the tractor; a power shaft operatively connected to said power means; power transmission mechanism operatively connected to said shaft; and bull shafts operatively connected to said transmission mechanism and to said drive wheels; said power shaft being removable from the tractor in the longitudinal line of the shaft and said bull shafts being removable laterally from the tractor, and said transmission mechanism being released from operative connection by the removal of said power shaft and bull shafts, and being removable as a whole from the tractor.

5. In a tractor, in combination, drive wheels, each wheel having a hand hole therethrough; power means for the tractor; a power shaft operatively connected to said power means; a removable rear bearing case for said shaft; power transmission mechanism operatively connected to said shaft; and bull shafts operatively connected to said transmission mechanism and to said drive wheels; said power shaft being removable rearwardly from the tractor by removal of said rear bearing case, and said bull shafts being removable from the tractor through a hand hole of said wheels, and said transmission mechanism being released from operative connection by removal of said power shaft and bull shafts, and being removable from the tractor.

6. In a tractor, in combination, drive wheels, each wheel having a hand hole therethrough; power means for the tractor; a power shaft operatively connected to said power means; a removable rear bearing case for said shaft; power transmission mechanism operatively connected to said shaft; and bull shafts operatively connected to said transmission mechanism and to said drive wheels; said power shaft being removable rearwardly from the tractor by removal of said bearing case, and said bull shafts being removable from the tractor through a hand hole of said wheels, and said transmission mechanism being released from operative connection by removal of said power shaft and bull shafts, and being removable as a whole from the tractor.

7. In a tractor, in combination, drive wheels, each wheel having a hand hole therethrough; power means for the tractor; a power shaft operatively connected to said power means; removable bearing means for said shaft; power transmission mechanism operatively connected to said shaft; a main housing for said transmission mechanism; a removable cover for said main housing; and bull shafts operatively connected to said transmission mechanism and to said drive wheels; said power shaft being removable from the tractor in the longitudinal line of the power shaft by removal of said bearing means and said bull shafts being removable from the tractor through a hand hole of said wheels, and said transmission mechanism being released from operative connection by removal of said power shaft and bull shafts, and being removable from the tractor by removal of said cover of the main housing.

8. In a tractor, in combination, drive wheels, each wheel having a hand hole therethrough; power means for the tractor; a power shaft operatively connected to said power means; a removable rear bearing case for said shaft; power transmission mechanism operatively connected to said shaft; a main housing for said transmission mechanism; a removable cover for said main housing; and bull shafts operatively connected to said transmission mechanism and to said drive wheels; said power shaft being removable rearwardly from the tractor by removal of said bearing case, and said bull shafts being removable from the tractor through a hand hole of said wheels, and said transmission mechanism being released from operative connection by removal of said power shaft and bull shafts, and being removable from the tractor by removal of said cover of the main housing.

9. In a tractor, in combination, drive wheels, each wheel having a hand hole therethrough; power means for the tractor; a power shaft operatively connected to said power means; a removable rear bearing case for said shaft; power transmission mechanism operatively connected to said shaft; a main housing for said transmission mechanism; a removable cover for said main housing; and bull shafts operatively connected to said transmission mechanism and to said drive wheels; said power shaft being removable rearwardly from the tractor by removal of said bearing case, and said bull shafts being removable from the tractor through a hand hole of said wheels, and said transmission mechanism being released from operative connection by removal of said power shaft and bull shafts and being removable as a whole by removal of said cover of the main housing.

10. In a tractor, in combination, drive wheels, each wheel having a hand hole therethrough; power means for the tractor; a power shaft operatively connected to said power means; removable bearing means for said shaft; power transmission mechanism operatively connected to said shaft; bull shafts operatively connected to said transmission mechanism and to said drive wheels; and clutch mechanism for the bull shafts; said power shaft being removable from the tractor in the longitudinal line of the power shaft by removal of said bearing means, and said bull shafts being removable from the tractor through a hand hole of said wheels, and said transmission mechanism, and bull shaft clutch mechanism being released from operative connection by removal of said power shaft and bull shafts, and being removable from the tractor.

11. In a tractor, in combination, drive wheels, each wheel having a hand hole therethrough; power means for the tractor; a power shaft operatively connected to said power means; a removable rear bearing case for said shaft; power transmission mechanism operatively connected to said shaft; a main housing for said transmission mechanism; a removable cover for said main housing; bull shafts operatively connected to said drive wheels; and clutch mechanism for the bull shafts comprised in said main housing; said power shaft being removable from the tractor by removal of said rear bearing case, and said bull shafts being removable from the tractor through a hand hole of said wheels, and said transmission mechanism and bull shaft clutch mechanism being released from operative connection by removal of said power shaft and bull shafts, and being removable from the tractor by removal of said cover of the main housing.

12. In a tractor, in combination, drive wheels, each wheel having a hand hole therethrough; power means for the tractor; a power shaft operatively connected to said power means; a removable rear bearing case for said shaft; power transmission mechanism operatively connected to said shaft; a main housing for said transmission mechanism; a removable cover for said main housing; bull shafts operatively connected to said transmission mechanism and to said drive wheels; and clutch mechanism for the bull shafts comprised in said main housing; said bull shaft clutch mechanism comprising dual portions, a portion for each bull shaft, and one portion being operable to the exclusion of the other portion; said power shaft being removable rearwardly from the tractor by removal of said rear bearing case, and said bull shafts being removable from the tractor through a hand hole of said wheels, and said transmission mechanism and bull shaft clutch mechanism being released from operative connection by removal of said power shaft and bull shafts, and being removable from the tractor by removal of said cover of the main housing.

13. In a tractor, in combination, a main frame; drive wheels, each wheel having a hand hole therethrough; power means for the tractor; a housing for said power means; a power shaft operatively connected to said power means; a removable rear bearing case for said shaft; power transmission mechanism operatively connected to said shaft; a main housing for said transmission mechanism; a removable cover for said main housing; and bull shafts operatively connected to said transmission mechanism and to said drive wheels; said housing for the power means and said main housing for the transmission mechanism being connected together and having three point suspension on said main frame to provide flexible support for the power means and transmission mechanism; said power shaft being removable rearwardly from the tractor by removal of said rear bearing case and said bull shafts being removable from the tractor through a hand hole of said wheels, and said transmission mechanism being released from operative relation by removal of said power shaft and bull shafts, and being removable from the tractor by removal of said cover of the main housing for the transmission mechanism.

14. In a tractor of the character described, the combination of a motor; drive wheels; a gear ring fixed to each wheel; bull shafts operatively connected to said motor and adapted to be withdrawn laterally from the tractor; a pinion fixed on the outer end of each bull shaft and engaging said internal gear; and a plate detachably secured to the outer end of said bull pinion shaft and having its periphery engaging the ring, for retaining the bull pinion shaft in place.

15. In a tractor of the character described, the combination of a main housing provided with front bearing housings and a bearing opening; a motor; drive wheels; an internal gear ring fixed to the inner face of each wheel and provided at its outer face with an annular shoulder forming with said wheels retaining grooves; bull pinion shafts operatively connected to said motor mounted in said bearing opening and bearings of each of said front bearing housings and adapted to be withdrawn laterally; a bull pinion fixed on the outer end of each bull pinion shaft and engaging said internal gear; and a retaining plate detachably secured to the outer end of said bull pinion shaft and engaging in said groove.

16. In a tractor of the character described, the combination of a main housing provided with laterally projecting bearing housings; a motor; a bearing supporting wall near the inner end of each of said bearing housings and provided with a bearing opening; a set of roller bearings disposed in the outer end of each of said bearing housings; drive wheels each comprising a disk provided with a closable hand hole therethrough; an internal gear ring fixed to the inner face of said disk and provided at its outer face with an annular shoulder forming with said disk a retaining groove; a bull pinion shaft operatively connected to said motor and mounted in said bearing opening and bearings of each of said front bearing housings and adapted to be withdrawn laterally through a closable hand hole when the hand hole is coaxial with the end of the bull shaft; a bull pinion shaft fixed on the outer end of each bull-pinion shaft and engaging said internal gear; and a circular retaining plate detachably secured to the outer end of said bull pinion and having its periphery engaging in said retaining groove.

17. In a tractor of the character described, the combination of a housing; a motor; drive wheels; a bull pinion shaft rotatably mounted in each side of said housing and operatively connected to said drive wheels and provided with a slidable cup-shaped clutch member; a pair of bearing brackets in said housing; a gear supporting sleeve supported in said brackets; a clutch member fixed on said sleeve and adapted to be engaged by said cup-shaped member; a thrust spindle in said supporting sleeve and engaging the inner end faces of the bull pinion shafts; and a master gear mounted on said supporting sleeve and operatively connected to said motor.

18. In a tractor of the character described, the combination of a main housing; an inner housing in said main housing; a motor; a change speed mechanism in said inner housing operatively connected to said motor; drive wheels; a bull pinion shaft rotatably mounted in each side of said main housing and operatively connected to said drive wheels and provided with a slidable cup-shaped clutch member; a pair of forwardly projecting bearing brackets on said inner housing; ball bearing sets in said brackets co-axial with said bull pinion shafts; a gear supporting sleeve supported in said bearing sets, each extremity of the supporting sleeve being screw threaded and the intermediate part between such extremity and the bearing set being splined; a clutch member splined on said intermediate part and adapted to be engaged by said cup-shaped member; means for holding the clutch member in place; a thrust spindle in said supporting sleeve and engaging the inner end faces of the bull pinion shafts; and a master gear mounted on said supporting sleeve and operatively connected to said change speed mechanism.

19. In a tractor of the character described, the combination of a main transmission housing; an inner transmission housing; a motor; drive wheels; a pair of bull shafts rotatably mounted in said main housing and operatively connected to said drive wheels; a clutch member on the bull pinion shaft and provided with a shift groove; a pair of bearing brackets on said inner housing; a supporting member operatively connected to the motor; clutch devices between said supporting member and said shafts respectively; a pair of transversely disposed slide rods slidably mounted in said main housing; a shift bracket secured to each slide rod and adapted to operate said devices; and unclutching levers engaging said slide rods respectively.

20. In a tractor of the character described, the combination of drive wheels; bull shafts operatively connected to said drive wheels and each having a reduced inner end and an intermediately splined portion; a clutch sleeve slidable on said splined portion of the bull pinion shaft and provided at its inner end with a clutch member; a motor; a gear member operatively connected to the motor; a clutch member fixed on said gear member and adapted to be engaged by said first named clutch member; and means for sliding the first named clutch member.

21. In a tractor of the character described, the combination of bearing housings; drive wheels; bull shafts operatively connected to said drive wheels and each having a reduced inner end and an intermediately splined portion and rotatably mounted in said bearing housings; a clutch sleeve slidable on said splined portion of the bull-pinion shaft and provided at its inner end with an annular flange and a cup-shaped clutch member forming a shift groove and provided with interior clutching lugs; a pair of bearing brackets in said housing; a gear supporting sleeve supported in said bracket; a male clutch member fixed on said sleeve and provided with lugs adapted to be engaged by said interior lugs of said cup-shaped member; a motor; a master gear mounted on said supporting sleeve and operatively connected to said motor; and means engaging in said groove for sliding the cup-shaped member.

22. In a tractor of the character described, the combination of a main housing formed with an upper parting plane; a cover housing resting on said main housing at said plane and provided with an upwardly pointing eyes; an inner housing secured to said cover; a power shaft in said housings; and a transmission mechanism in said inner housing and operatively connected to said power shaft.

23. In a tractor of the character described, the combination of a main transmission housing provided with an upper flanged face forming a parting plane; a cover housing resting on said main housing at said plane and provided with a transverse partition at its forward part; upwardly pointing eyes on said cover housing; an inner transmission housing provided with front and rear walls bolted to said transverse partition and to the rear part of said housing cover; a power shaft passing through said housings at said plane; a change speed mechanism in said inner housing and operatively connected to said power shaft; and drive wheels operatively connected to said mechanism.

24. In a tractor of the character described, the combination of a housing formed with an upper parting plane; a cover housing resting on said main housing at said plane; a bearing casing mounted in said housings at said plane; a power shaft in said casing and housing, said shaft and casing being removable longitudinally of the shaft; a transmission mechanism in said inner housing and operatively connected to said power shaft; and drive wheels operatively connected to said mechanism.

25. In a tractor of the character described; the combination of a motor; a main housing formed with an upper parting plane; a cover housing resting on said main housing at said plane; an inner housing secured to said cover housing at said plane; a removable bearing casing mounted in said housings at said plane; a power shaft engaging said casing and connected to said motor and removable by removal of said bearing casing; transmission mechanism in said inner housing and operatively connected to said power shaft; and drive wheels operatively connected to said mechanism.

26. In a tractor of the character described, the combination of a main transmission housing formed with an upper parting plane; a cover housing resting on said main housing at said plane; a motor; an inner transmission housing secured to said cover housing at said plane; a bearing casing mounted in the rear part of said main housing and said cover at said plane; a power shaft in said casing and in line with and connected to said motor, said casing and said shaft being rearwardly removable; a transmission mechanism in said inner housing and operatively connected to said power shaft; and drive wheels operatively connected to said mechanism.

27. In a tractor of the character described, the combination of a main transmission housing provided with an upper flanged face forming a parting plane; a cover housing resting on said main housing at said plane and provided with a transverse partition at its forward part; a motor; a crank shaft for said motor; an inner transmission housing provided with front and rear walls secured to said transverse partition and to the rear part of said housing cover; a bearing casing mounted in the rear part of said main housing, and connecting said housing cover and said rear wall at said plane of parting; bearings in said casing and between said transverse partition and front wall at said plane of parting; a power shaft in said bearings connected to said crank shaft and projecting to the rear of the housings, said bearing casing, said bearings, and said power shaft being rearwardly removable; a change speed mechanism in said inner housing and operatively connected to said power shaft; and drive wheels operatively connected to said mechanism.

28. In a tractor of the character described, the combination of drive wheels; power means for the tractor; a power shaft operatively connected to said power means; power transmission mechanism operatively connected to said shaft; bull shafts operatively connected to said transmission mechanism and to said drive wheels; and clutch mechanism for the bull shafts; said clutch mechanism comprising dual portions, a portion for each bull shaft, and one portion being operable to the exclusion of the other portion; said power shaft and bull shafts being removable from the tractor; and said transmission mechanism and bull shaft clutch mechanism being released from operative connection by removal of said power shaft and bull shafts and removable from the tractor.

29. In a tractor of the character described, the combination of drive wheels; power means for the tractor; a power shaft operatively connected to said power means; power transmission mechanism operatively connected to said shaft; bull shafts operatively connected to said transmission mechanism and to said drive wheels; and clutch mechanism for the bull shafts; said clutch mechanism comprising dual portions, a portion for each bull shaft, and one portion being operable to the exclusion of the other portion; said power shaft and bull shafts being removable from the tractor, the bull shafts being removable from the tractor through said drive wheels; and said transmission mechanism and bull clutch mechanism being released from operative connection by removal of said power shaft and bull shafts and removable from the tractor.

EVERETT S. CAMERON.

Witnesses:
BENJAMIN HARRIS,
H. D. PENNEY.